US012703648B2

(12) United States Patent
Gayoso et al.

(10) Patent No.: US 12,703,648 B2
(45) Date of Patent: Aug. 11, 2026

(54) FLUID RECYCLING UNIT FOR AIRCRAFT

(71) Applicant: MAG Aerospace Industries, LLC, Carson, CA (US)

(72) Inventors: Jean Gayoso, Los Angeles, CA (US); Peter Kazemi, Irvine, CA (US); David Beach, Los Alamitos, CA (US); Nguyen Tram, Chino Hills, CA (US); Steven Schwartz, Long Beach, CA (US); Joerg Stachowski, San Pedro, CA (US); John Todd, Carson, CA (US); James Waese, Carson, CA (US); Arnaud Namer, Torrance, CA (US); Razmik Boodaghians, Glendale, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 393 days.

(21) Appl. No.: 18/022,334

(22) PCT Filed: Aug. 21, 2020

(86) PCT No.: PCT/US2020/047372
§ 371 (c)(1),
(2) Date: Feb. 21, 2023

(87) PCT Pub. No.: WO2022/039754
PCT Pub. Date: Feb. 24, 2022

(65) Prior Publication Data

US 2023/0339779 A1 Oct. 26, 2023

(51) Int. Cl.
*C02F 1/00* (2023.01)
*B64D 11/02* (2006.01)
(Continued)

(52) U.S. Cl.
CPC ................ *C02F 1/001* (2013.01); *C02F 1/46* (2013.01); *B64D 11/02* (2013.01);
(Continued)

(58) Field of Classification Search
CPC .... B64D 11/02; C02F 2103/002; C02F 1/001; C02F 2201/001; C02F 2103/005; C02F 2303/02; C02F 1/46; E03D 5/003
(Continued)

(56) References Cited

U.S. PATENT DOCUMENTS 4,162,218 A * 7/1979 McCormick ............ C02F 1/006 210/167.01
4,359,789 A * 11/1982 Roberts ................... E03B 1/041 4/300

(Continued)

FOREIGN PATENT DOCUMENTS

CN 1124174 A 6/1996
CN 102616986 A 8/2012

(Continued)

OTHER PUBLICATIONS

International Patent Application No. PCT/US2020/047372, International Search Report and Written Opinion, dated May 12, 2021.

(Continued)

*Primary Examiner* — Claire A Norris
(74) *Attorney, Agent, or Firm* — Kilpatrick Townsend & Stockton LLP

(57) ABSTRACT

A fluid recycling unit for use on board an aircraft or other passenger transportation vehicle. The fluid recycling unit captures various types of used fluids, filters or otherwise appropriately treats the fluids, and recycles the fluids for various uses onboard the vehicle.

20 Claims, 12 Drawing Sheets

(51) Int. Cl.
*C02F 1/46* (2023.01)
*C02F 103/00* (2006.01)

(52) U.S. Cl.
CPC .. *C02F 2103/002* (2013.01); *C02F 2103/005* (2013.01); *C02F 2201/001* (2013.01)

(58) Field of Classification Search
USPC .................................................. 210/153, 916
See application file for complete search history.

(56) References Cited

U.S. PATENT DOCUMENTS

| | | | |
|---|---|---|---|
| 7,533,426 | B2 | 5/2009 | Pondelick |
| 9,260,323 | B2 | 2/2016 | Boodaghians et al. |
| 9,448,563 | B2 | 9/2016 | Goeschel et al. |
| 9,458,028 | B2 * | 10/2016 | Boodaghians .......... C02F 1/001 |
| 9,540,107 | B2 | 1/2017 | Boodaghians et al. |
| 9,701,410 | B2 | 7/2017 | Boodaghians et al. |
| 9,718,549 | B2 | 8/2017 | Hennings et al. |
| 9,869,079 | B2 | 1/2018 | Boodaghians et al. |
| 9,902,497 | B2 | 2/2018 | Boodaghians et al. |
| 10,093,560 | B2 * | 10/2018 | Dale ..................... C02F 1/4672 |
| 10,308,361 | B2 | 6/2019 | Boodaghians et al. |
| 2014/0021112 | A1 | 1/2014 | Boodaghians et al. |
| 2019/0248496 | A1 * | 8/2019 | Boodaghians ...... H01M 8/0662 |
| 2022/0194820 | A1 | 6/2022 | Qiu |

FOREIGN PATENT DOCUMENTS

| | | | |
|---|---|---|---|
| CN | 106215476 | A | 12/2016 |
| CN | 110124516 | A | 8/2019 |
| DE | 102018005366 | A1 | 10/2019 |
| JP | 10512798 | A | 12/1998 |
| JP | 2000513995 | A | 10/2000 |
| JP | 2015525709 | A | 9/2015 |
| JP | 2016516577 | A | 6/2016 |
| WO | 9612547 | A1 | 5/1996 |
| WO | 2018063373 | A1 | 4/2018 |
| WO | WO-2020030943 | A1 * | 2/2020 |

OTHER PUBLICATIONS

Japanese Application No. 2023-513189, Notice of Decision to Grant mailed on May 27, 2025, 3 pages.
Japanese Application No. 2023-513189, Office Action mailed on Sep. 24, 2024, 12 pages (5 pages of Original Document and 7 pages of English Translation).
China Appl. No. 202080105918.6, Office Action, Jan. 26, 2026, 15 pages.

* cited by examiner

FLUID RECYCLING UNIT FOR AIRCRAFT

FIELD OF THE DISCLOSURE

According to certain embodiments of this disclosure, there is provided a fluid recycling unit for use on board an aircraft or other passenger transportation vehicle. The fluid recycling unit captures various types of used fluids, then it filters or otherwise appropriately treats the fluids, and recycles the fluids back to one or more water-using systems for various uses onboard the vehicle.

BACKGROUND

Water is an expensive resource to store aboard passenger transportation vehicles, such as aircraft, due to its high density and large volume of consumption on flights, especially on international flights. In fact, water weight itself makes up the majority of the total net weight of potable water systems on board aircraft and other passenger transportation vehicles. During aircraft take off, this weight becomes particularly expensive in terms of fuel requirements. Additionally, during extended flights, passenger use of potable) i.e., drinkable quality) water from sink faucets accounts for hundreds of gallons of water pouring down lavatory sinks each flight, which accounts for a large amount of in-flight water consumption. This water is generally referred to as “grey water,” which refers to water that has been soiled but that does not contain sewage or “black water.” “Grey water” is a term commonly used to describe the spent or used water that has been used for handwashing. After the potable water exits the faucet for rinsing the user’s hands, the spent water/grey water is considered waste and is typically discharged overboard or introduced into the onboard waste system.

In addition to being used for handwashing purposes, potable water is also typically used on board vehicles for toilet flushing, even though such high quality/drinkable water is not necessarily required for such flushing. In the enclosed environment of a passenger transportation vehicle such as a commercial passenger aircraft, two primary toilet flushing mechanisms exist. First, there are chemical recirculating toilets that use a disinfecting fluid. Second, there are vacuum toilets that use potable water from the water tank. Galley disposal flushing systems and lavatory handwashing faucets also use potable water. These applications currently use the same water quality source as appliances that require drinkable quality water sources, such as coffee and espresso machines, galley water dispensers, and so forth. This leads to additional weight that needs to be carried on board the aircraft due to the tank size, as well as due to the water purification systems required for purifying larger volumes of water.

Various attempts at reusing grey water have been explored. Examples of solutions identified by the present assignee are outlined and described in various U.S. patents, including but not limited to U.S. Pat. No. 9,458,028 (titled “Mixed Fluid Filtration System”); U.S. Pat. No. 9,540,107 (titled “Systems and Methods for Treating Grey Water Onboard Passenger Transport Vehicles”); and U.S. Pat. No. 10,308,361 (titled “Disposable Modular Reservoir”), the entire contents of each of which are incorporated herein by reference. As useful as those solutions have been and continue to be, improvements continue to be explored. By using strategies of water filtering and treatment, the present inventors have identified ways to decrease the amount of water that needs to be carried on board by cleaning and reusing or recycling various types of fluids.

SUMMARY

Accordingly, the present inventors have designed a fluid recycling unit for use onboard passenger transportations, such as aircraft. The fluid to be recycled can be water, grey water from an aircraft sink, or other types of wastewater. The grey water treatment components described herein may be used in connection with an existing reservoir in order to improve maintenance, lower weight, and extend the reservoir’s use options. Further features are described herein.

The terms “invention,” “the invention,” “this invention” “the present invention,” “disclosure,” “the disclosure,” and “the present disclosure,” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a system for capturing used water, treating the used water to a determined treatment level to provide treated water, and recycling the treated water on board a passenger transportation vehicle. The system may have a reservoir in fluid communication with a basin, the reservoir comprising an upper opening, a top lid with a fluid inlet for receiving used water from the basin, and an outlet. The system may also be provided with a filter system configured to be removably positionable within the reservoir, the filter system configured to treat the used water to a determined treatment level to provide treated water. There may also be an adapter positionable at the outlet of the reservoir, the adapter comprising a first fluid channel for delivering the treated water to a first location and a second fluid channel for delivering any untreated water or excess treated water to a second location. The first location may be a water-using system or a fluid treatment stack. Exemplary water-using systems may be a toilet flush system, a sink faucet, or a potable water delivery system. Exemplary second locations may be a drain line, a vacuum waste tank, a drain mast, a fluid treatment stack, or any combination thereof.

In one example, the determined treatment level comprises a first treatment level sufficient for use of the treated water as toilet flushing water. In another example, the determined treatment level may be a second treatment level sufficient for use of the treated water as potable or drinkable water quality.

The filter system may be a porous polymeric mechanical micro filter. The filter system may be an electrochemical filter comprising a porous anode filter core and a metal mesh cathode. It is possible for the filter system to be positioned within the reservoir via a filter holder.

Some embodiments include a mixing pump to enhance water contact time. Additionally or alternatively, the filter system may incorporate a spiral or stepped configuration to enhance water contact time. The top lid may have one or more backwash rings for generating a cleaning vortex within the reservoir.

There may be a gas absorbent material positioned within the reservoir to capture and react with exhaust gases released during filtration. There may be an exhaust extraction line for delivering exhaust gases released during filtration out of the reservoir. The exhaust extraction line may deliver exhaust gases to an aircraft outflow valve. In another example, the exhaust extraction line delivers exhaust gases to a hydrogen fuel cell.

This disclosure also provides a system for recycling fluid on board a passenger transportation vehicle, comprising: collecting used water from a lavatory sink in a grey water reservoir; and delivering the used water to one of: (a) a first filtration system sufficient to treat the used water for recycled use in lavatory toilet flushing; or (b) a second filtration system sufficient to treat the used water for recycled use in a lavatory faucet. In this example, there may also be a third filtration system configured to receive black water from lavatory toilet flushing and sufficient to treat the received water for recycled use in additional lavatory flushing.

DETAILED DESCRIPTION

Embodiments of the present disclosure provide a fluid recycling system that captures used fluids, cycles or otherwise directs the used fluids through one or more filtration systems, and re-delivers the treated fluids to various locations on board the vehicle. Specific examples direct water flow through a lavatory (or other system that requires water and waste treatment) in order to capture used/grey water, to cleanse the grey water through a series of treatment steps. The water may then be redirected to the faucet for reuse in handwashing or other potable water use or to the toilet for flush water. The treatment steps may be altered, depending upon the ultimate use of the water. Other specific embodiments provide a filter system that is replaceable and removable from a pre-existing reservoir mounted in fluid communication with the water system.

One embodiment described herein that being used in order to capture, treat, and redirect various types of used water may be in connection with a currently existing grey water interface valve. An exemplary graywater interface valve is shown and described by U.S. Pat. No. 7,533,426 titled "Gray Water Interface Valve Systems and Methods," and co-owned by the present assignee, the contents of which are incorporated herein. This patent describes a reservoir that may be positioned beneath a sink basin in order to collect used hand-washing water, also referred to herein as "grey water." The purpose of the reservoir disclosed in the above patent is to house the grey water and to deliver the grey water to the main waste tank via a valve that minimizes the vacuum flushing sound. The present disclosure provides a filter system that may be used in connection with this reservoir (or other reservoirs) in order to filter the grey water that is captured for reuse/recycling in other areas of the aircraft. These other areas may be for use as toilet flushing liquid, for use as hand-washing water, for use as potable water as long as the disinfection is to high enough levels, or for any other appropriate uses.

Figure 1:
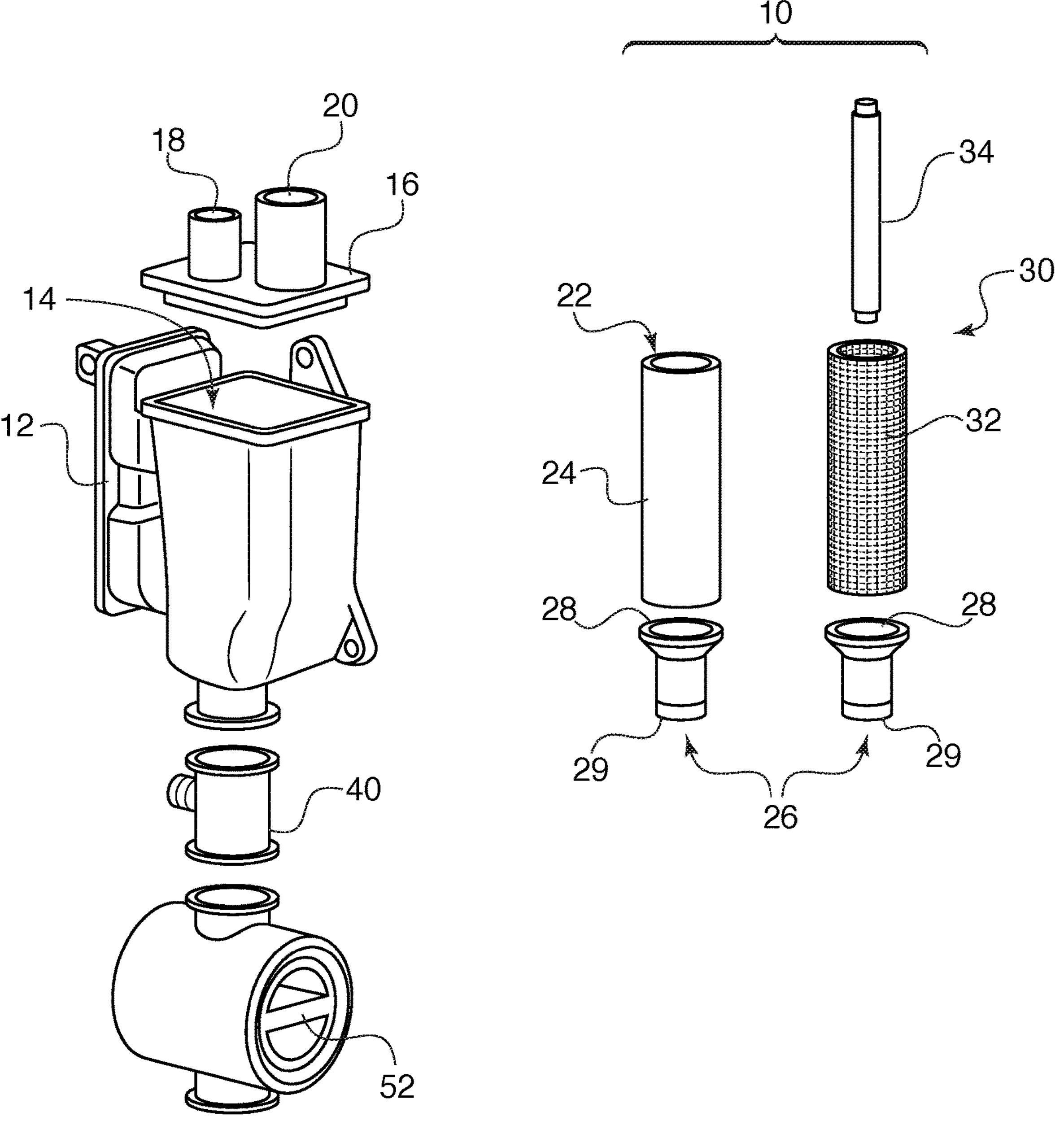
FIG. 1 shows an exploded perspective view of a reservoir with alternate filtration system options.

Referring now to FIG. 1, there is shown to types of filter systems 10 that may be used in connection with a pre-existing reservoir 12, such as the reservoir described by U.S. Pat. No. 7,533,426, described above. Although the filter systems 10 are described and shown for use in connection with this pre-existing reservoir 12, it should be understood that the disclosed the filter system(s) 10 may be used with alternate reservoirs, or any other reservoir that may be associated with a sink basin. One exemplary alternate reservoir is shown and described by U.S. Pat. No. 10,308,361 ("Disposable Modular Reservoir"). This reservoir is easily removed and replaced into the water flow system. As shown, the reservoir 12 has an upper opening 14 that is configured to receive the filter system 10. A top lid 16 may be secured over the reservoir 12. The top lid 16 may both provide an inlet 18 into the reservoir 12, as well as provide a holding function for the filter system 10. Top lid 16 may also incorporate a vent 20 which allows intake and release of air from the reservoir 12. The vent 20 may also be used to backwash the filter system 10, as described more fully below.

Various types of filter systems 10 are possible for use and considered within the scope of this disclosure. In one example, the filter system 10 is a porous polymeric mechanical micro filter 22. In another example, the filter system 10 is a two-part electrochemical filter 30. In another example, it is possible to use both types of filters together. The filters may function individually, sequentially, or collectively. It should be understood that the treatment steps may be altered, depending upon the ultimate use of the water. For example, if the captured grey water is to be used as toilet flush water, it need not be treated to the same level as a potable water. It is possible for the reservoir 12 to be used to treat grey water to a first level. If water needs to be treated to a second or higher level, the water may be delivered to one or more additional treatment stacks, such as those described by U.S. Pat. No. 9,540,107 (co-owned by the present assignee.) Possible treatments and process flows are also described below. Additionally or alternatively, the water may also be delivered to one or more UV light treatment systems, or chemical treatment systems, many of which are described by patents and patent applications co-owned by the present assignee. Non-limiting examples of this technology are described by U.S. Pat. Nos. 10,266,426; 9,376,333; 9,260,323, all of which are owned by the present assignee.

Figures 2, 3:
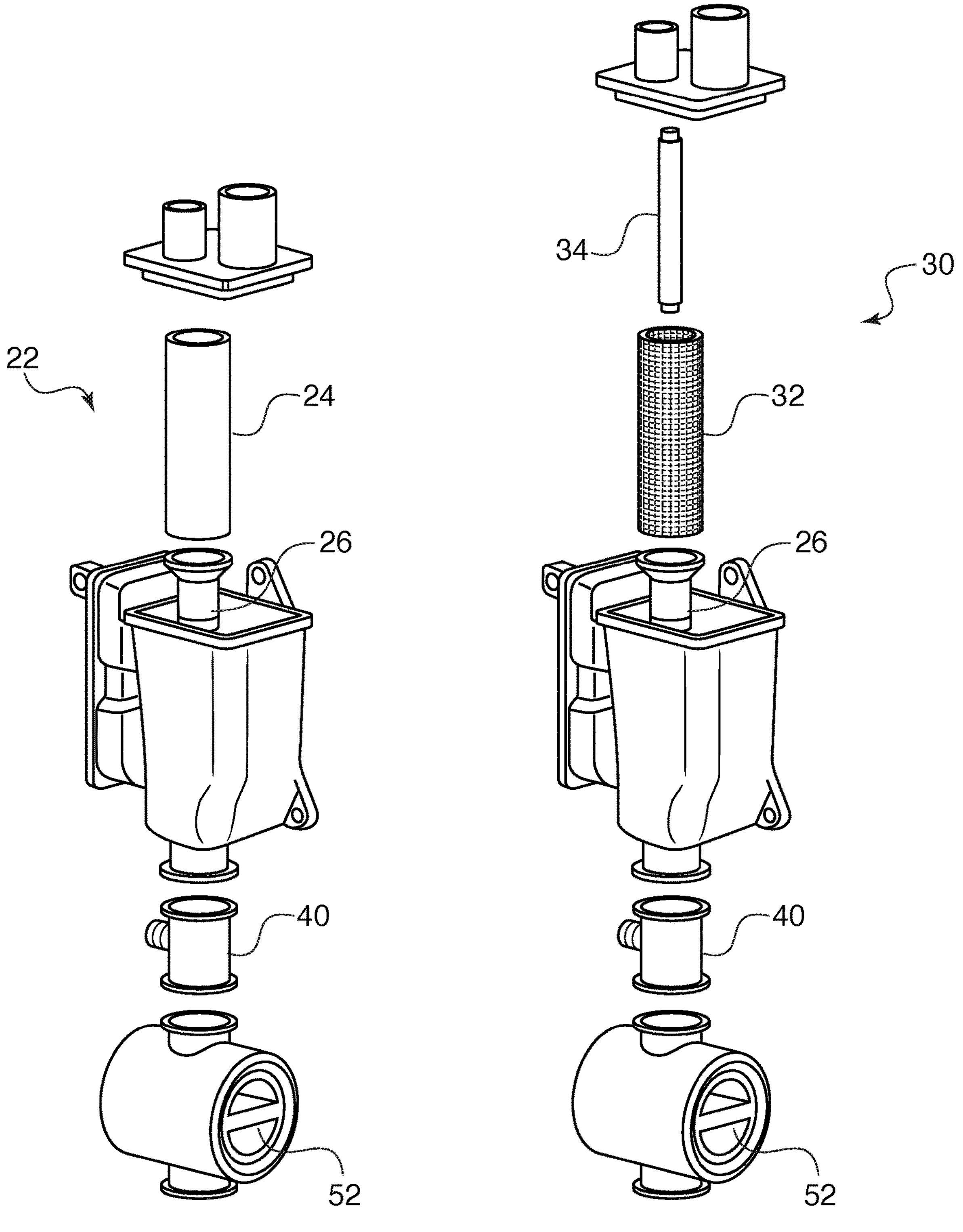
FIG. 2 shows an exploded perspective view of a porous mechanical filter system.
FIG. 3 shows an exploded perspective view of an electrochemical filter system.

In the porous polymeric mechanical micro filter 20 embodiment shown by FIGS. 1 and 2, there may be provided a filter body 24. In a specific example, the filter body 24 has an elongated cylindrical shape. The porosity of the filter may range from any appropriate pore size that allows the desired filtration. Exemplary filters are manufactured and sold by Porex Filtration Group®. The filter body 24 may be secured in place via a filter holder 26. In one example, the filter holder 26 has an upper portion 28 configured to receive and support the filter body 24 and a lower portion 29 configured to cooperate with an adapter 40, described further below.

In the two-part electrochemical filter 30 embodiment shown by FIGS. 1 and 3, there may be provided a metal mesh cathode 32 that receives a porous anode 34. As described above, these components may be secured in place via a filter holder 26. Electrochemical filters based on porous conductive materials can be used to purify waste water by removing effluents and other electrolytes by removing undesired materials such as heavy metals, salts, organic molecules, bacteria, or other biological contaminants. Electrochemical filters have two main principles of operation: they may operate via deposition with charge transfer or electrodeposition (or they may operate via adsorption without charge transfer called electrosorption (based on electrostatic interaction similar to a capacitor). Although electrochemical filters have been used in other technology areas, use of electrochemical filters in connection with treating grey water for reuse on board an aircraft has not been previously explored or suggested in the industry. Exemplary electrochemical filters are manufactured and sold by CalTech Industrial Corporation.

Although two possible filter options are described, it should be understood that other filter options are possible and considered within the scope of this disclosure. For example, the mixed fluid filtration system shown and described by U.S. Pat. No. 9,458,028 (co-owned by the present assignee) is also a filter option that may be used. The system may be designed to be positioned within a pre-existing reservoir 12.

In short, the general intent of the described filter system 10 is to adapt an existing reservoir 12 to receive a filter so that the reservoir 12 may function as a grey water reuse and filtering system, rather than directing the grey water elsewhere for filtering or rather than designing an extra (or separate) reservoir component for the filtering function. The filter system 10 is intended to be insertable and removable from the reservoir 12 in a relatively easy manner. In short, it is considered to be a "plug-and-play" filtering solution. The filter system 10 components that are positioned within the reservoir 12 are made modular so that rather than removing the entire reservoir/built in filter system, the filter and filter holder can be separately removed from the reservoir system. This can help improve turnaround time for maintenance of the system.

Figure 4:
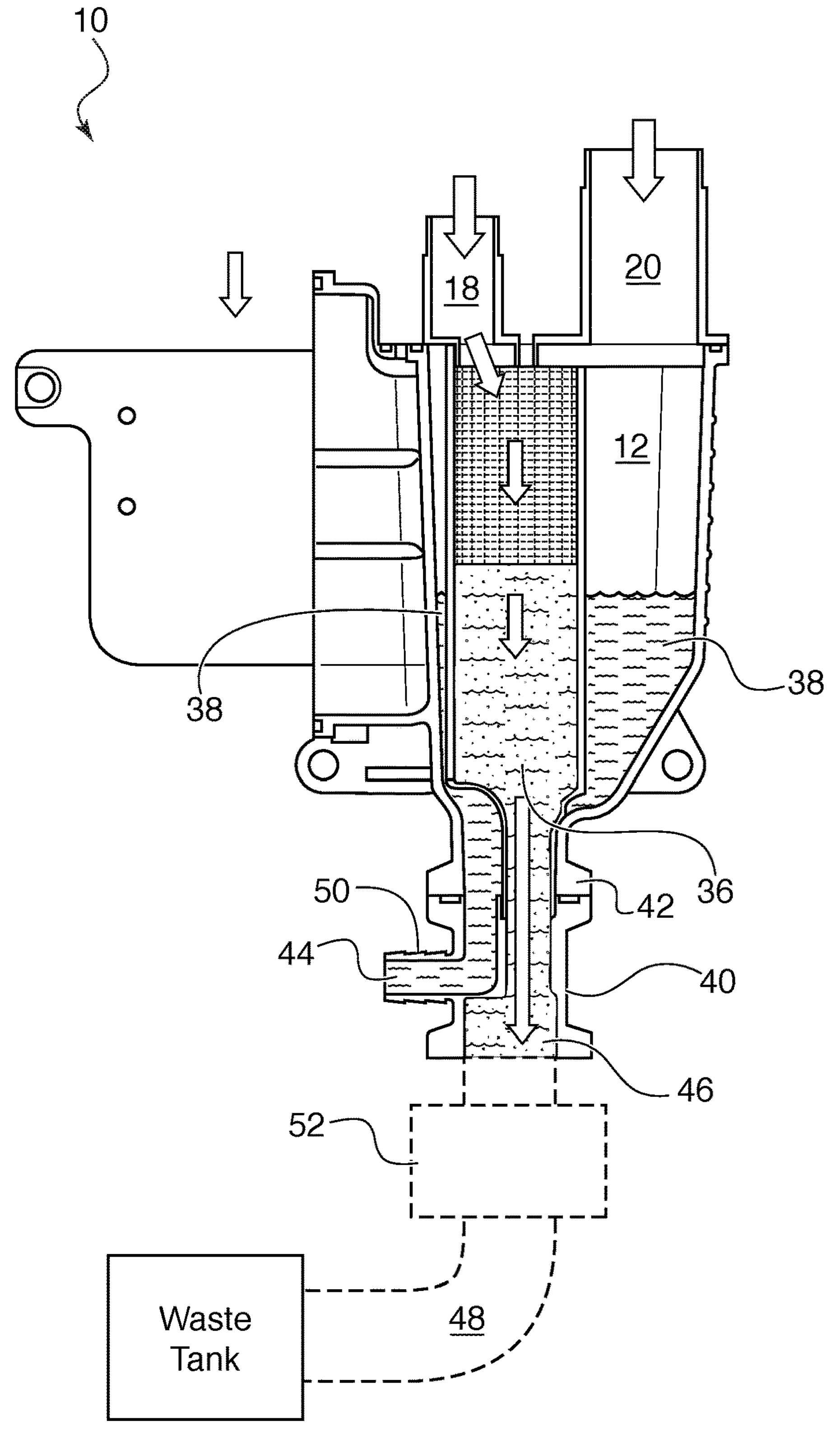
FIG. 4 shows a cross-sectional view of a reservoir with a filter system positioned therein.

FIG. 4 illustrates how wastewater may move across the filter system 10. As influent waste water or grey water flows into inlet 18 (from a sink basin or other water use device), the fluid is received into an interior channel 38 of the filter system 10. As the grey water/fluid is treated by the filter system 10, it flows from the interior channel 36 to an area 38 of the reservoir 12 that is external to the filter system. Water may be forced to flow through the filter system 10 multiple times due to a mixing pump, or other water flow system, as described below. Once the flow is complete, the "cleaned" water in the external area 38 is allowed to flow into the adapter 40.

FIGS. 1-3 show an adapter 40 and its relationship to the reservoir 12. FIG. 4 shows a cross-sectional view of the adapter 40. As shown, the adapter 40 is configured to cooperate with an outlet 42 of the reservoir 12. The adapter 40 may be friction fit, screw, secured by adhesive, or attached to the reservoir outlet 42 in any other appropriate manner. In one specific example, the adapter 40 may be a-T diverter with at least two fluid channels 44, 46. A first fluid channel 44 may be used to direct water that has been treated by the filter system 10 (which may now be referred to as "treated water") to a water-using system. The water-using system may be a toilet flushing system, a sink faucet or other potable water source. First fluid channel 44 may have an outlet 50 that may cooperate with any appropriate conduit to deliver the water away from the reservoir 12 for its ultimate use. A fluid pump may be used to direct water as desired.

A second fluid channel 46 of the adapter 40 may be used to direct any untreated water (or any treated water that does not need to be used), or any other unwanted or reservoir excess fluid into a drain line 48. Evacuation into the drain line 48 generally delivers fluid in the second fluid channel to the on board waste tank. It is also possible, however, for the drain line 48 to lead to the drain mast or other external drain source. This adapter 40 prevents the reservoir from needing to have a separate outlet. Instead, the adapter 40 is installed onto the existing reservoir outlet 42.

A pinch or flush valve 52 may also be provided that creates an interface between the onboard vacuum waste system and the reservoir 12. When the valve 52 is opened, vacuum is applied to the reservoir 12 (and the filter system 10 contained within the reservoir 12). This may force fluid contained within the reservoir into the vacuum waste system. Opening of the valve 52 may also be done to backwash/clean the filter system 10. This flow is illustrated by FIG. 4.

Figure 5:
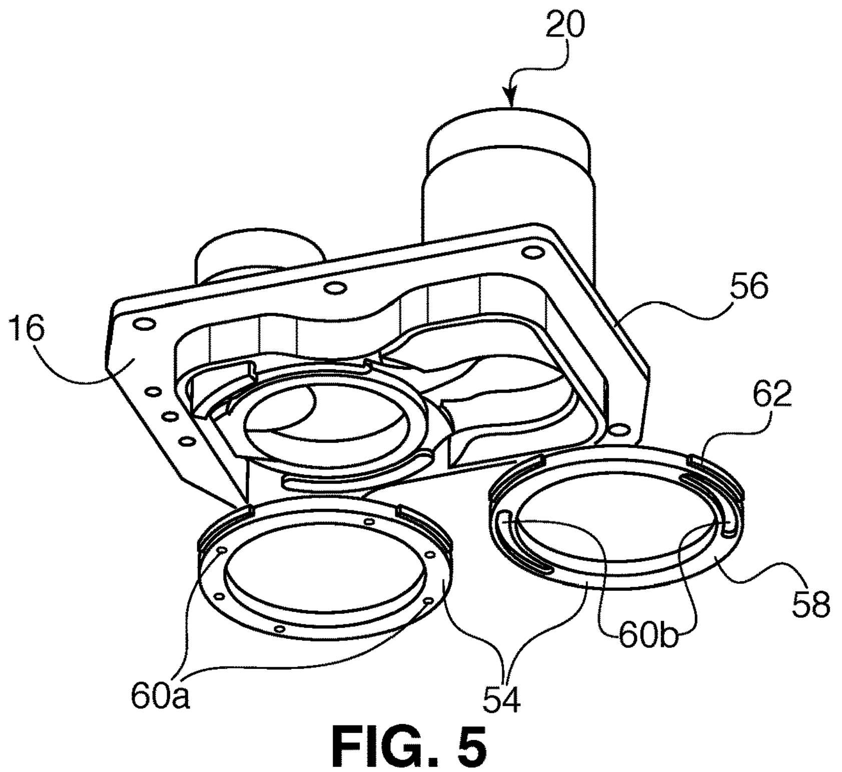
FIG. 5 shows an exploded view of a top lid with alternate versions of backwash rings.
Figure 6:
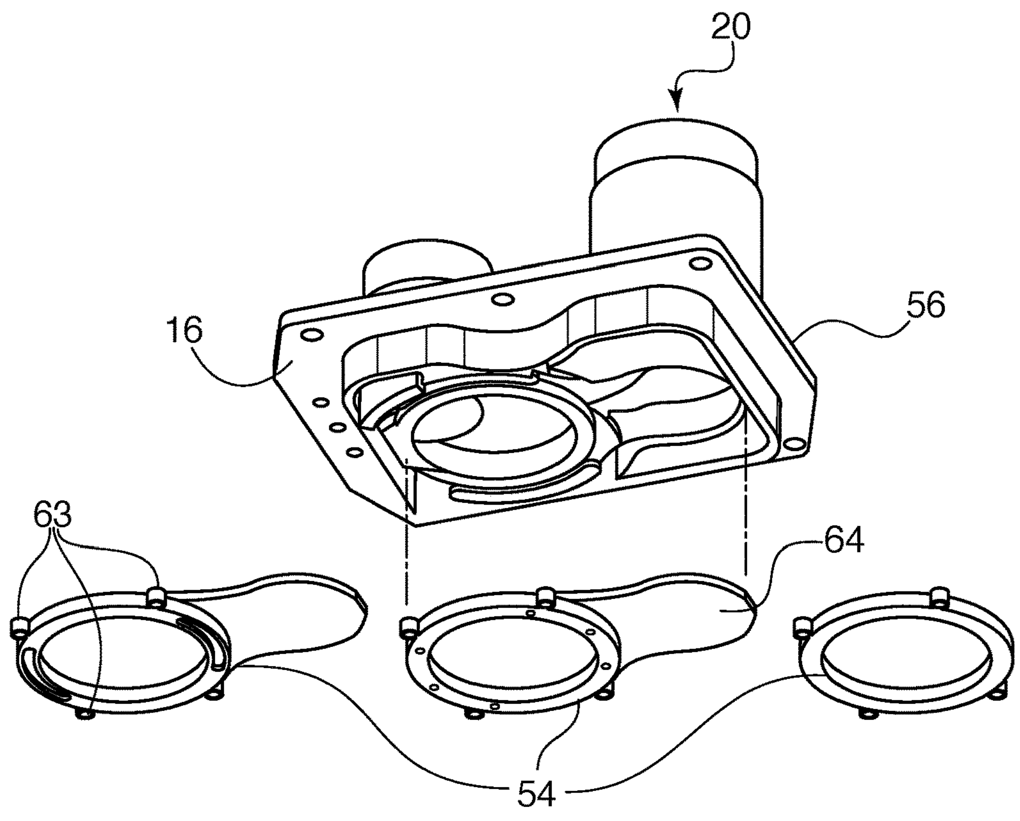
FIG. 6 shows an exploded view of a top lid with further alternate versions of backwash rings.

As shown by FIGS. 5 and 6, a backwash ring 54 may be used to help backwash the filter system 10. Various options are illustrated by these figures. Generally, the backwash ring 54 is shaped to fit at the base 56 of the inlet 18, where the inlet 18 meets the top lid 16. Referring now to FIG. 5, backwash ring 54 is shown generally having a circular perimeter 58 with one or more openings 60 positioned around the perimeter 58. The one or more openings may be circular openings *60a* formed within the body of the ring 54, elongated slits *60b*, any other appropriate shape, or any combination thereof. It is also possible for the backwash ring 54 to have one or more protrusions 62 along the external of the perimeter for securement within the vent base 56. For example, one of the one or more protrusions 62 may cooperate with a groove or other internal cavity of the top lid 16, allowing the backwash ring 54 to be securely positioned in place. In an alternate example, the backwash ring 54 may be secured to the top lid 16 via screws or other fasteners that may be received through one or more fastener receiving holes in the backwash ring perimeter.

As illustrated by FIG. 6, one version of a ring may be devoid of any openings 60 in the perimeter ring (although securement openings 63 may be provided along the external of the ring perimeter). A ring devoid of openings 60 is shown as the right ring in FIG. 6. Use of this version fitted into the base 56 allows air to go straight through the reservoir. This allows the system to function in a traditional way, for example, if a filter is not positioned in the reservoir and no backwash is required. FIG. 6 also shows backwash ring examples 54 with block elements 64. Block element 64 may be used to block the vent 20. The ring 54 may be positioned below the inlet 18 such that the block element 64 lies below the vent 20. Block element 64 forces air pulled into the vent to "curve" and flow into the filter system 10. The air is transferred around the filter for back washing purposes. The larger the openings in the ring perimeter, the more air flow is allowed for backwashing purposes. The overall aim of the device is that it can be used as a standard Grey Water management unit (with the use of the right ring, devoid of openings) and/or it can be used as a unit to treat grey water for re-use when fitted with one of the backwash rings with openings. Therefore, the system offers manufacturing flexibility as a function of intended use onboard an aircraft.

In use, when the valve 52 is opened and vacuum is applied to the reservoir 12, air is pulled in through the vent 20. The positioning of a backwash ring 54 at the base 56 of the vent forces air in through the one or more openings 60. This pulls air into the external area 38, which forces fluid held within the external area 38 to flow across the filter system 10 and into the interior channel 36. This is illustrated by inward arrows on FIG. 4. This movement of the treated water in the external area 38 across the filter system and into the interior channel 36 helps remove any residue that may have accumulated along the interior of the filter system 10. Fluid from the interior channel is then pulled into the onboard waste tank. This backwash filtration process is described more fully in U.S. Pat. No. 9,458,028, owned by the present assignee and incorporated herein by reference.

Figure 7:
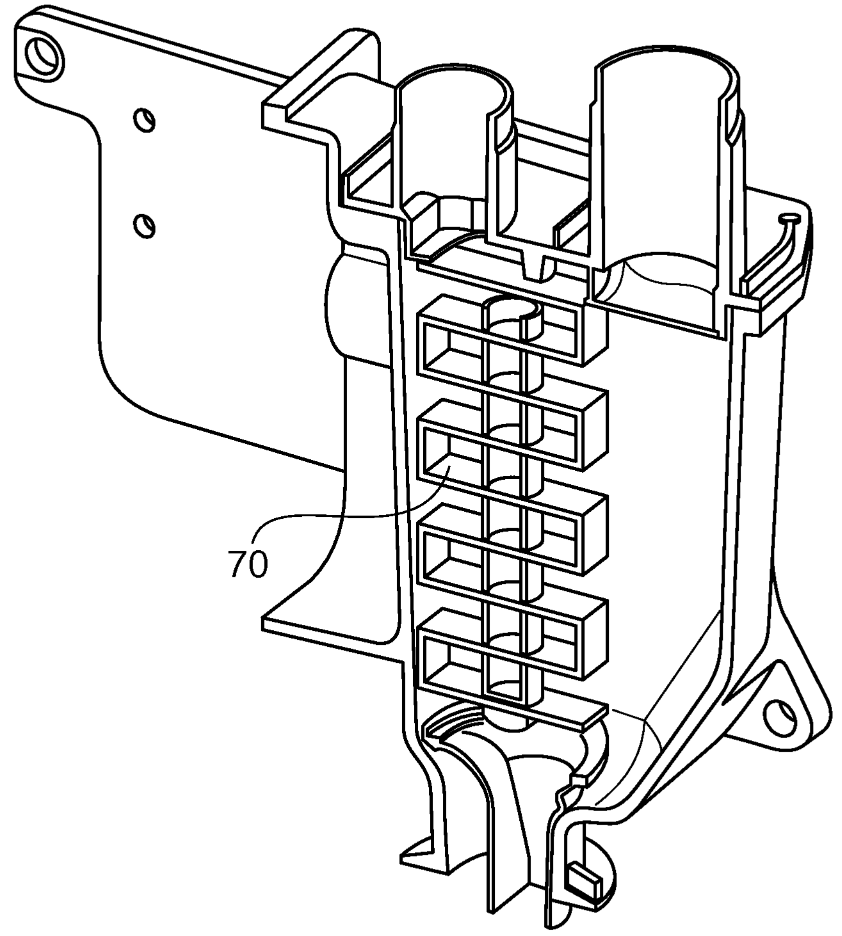
FIG. 7 shows a side cross-sectional view of a reservoir with a staircase like filter system.
Figure 8:
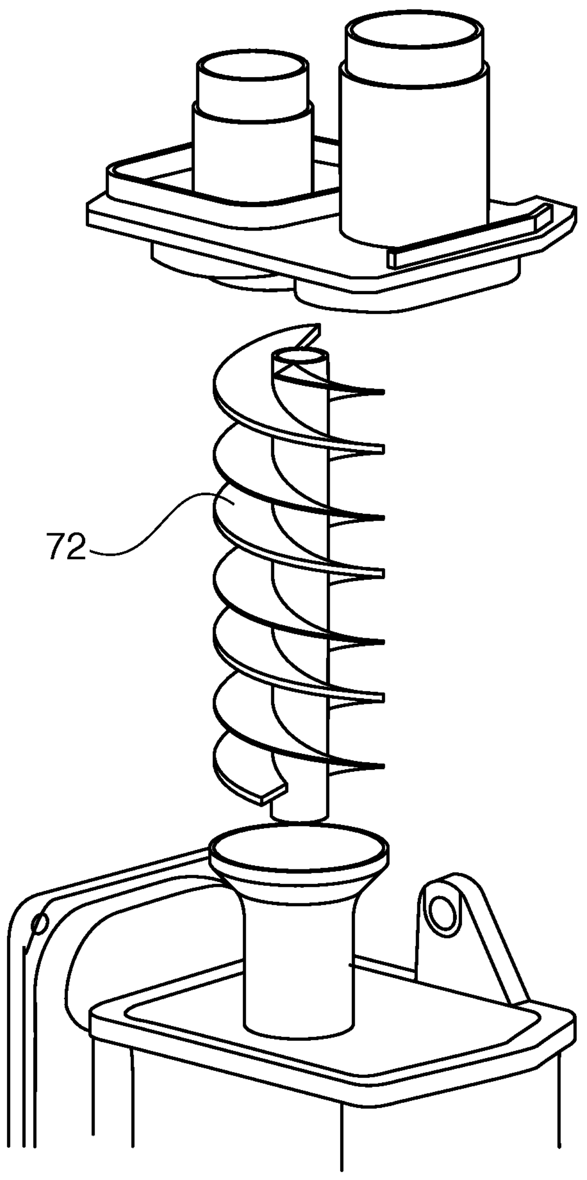
FIG. 8 shows an exploded view of a reservoir and lid with a spiral like filter system.

FIGS. 7 and 8 illustrate alternate filter system options. FIG. 7 illustrates one embodiment of a filter that has a stair or step-like filter 70 configuration. FIG. 8 illustrates one embodiment of a filter that has a rotational or spiral-like filter 72 configuration. These embodiments allow the fluid passing over or through the filter system to cross over cathodes and anodes several times, such that the fluid contacts both filter portions. A chemical reaction happens with each pass such that the water is treated more fully. The filter system may be shaped so that fluid treatment can be processed or otherwise facilitated via gravity (e.g., gravity fed treatment) as it falls or passes through the filter.

Figure 9:
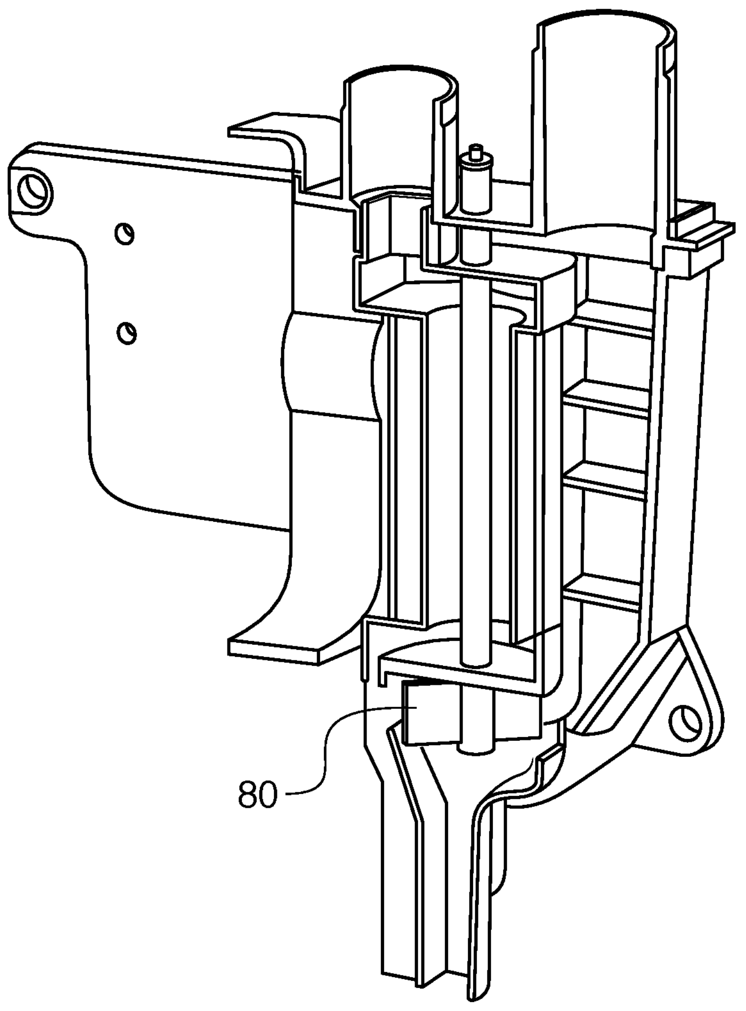
FIG. 9 shows a side cross-sectional view of a reservoir with a mixing system.

Additionally or alternatively, it is possible to provide a mixing pump 80 associated with the filter system. This is illustrated by FIG. 9. The mixing pump 80 can have an impeller shape or a mixer shape, and can cause the fluid within the filter to slosh around or otherwise contact more portions of the filter. It is also possible to provide a pump that causes the fluid to move up toward an upper portion of the filter and then flow back down for multiple passes.

Figure 10:
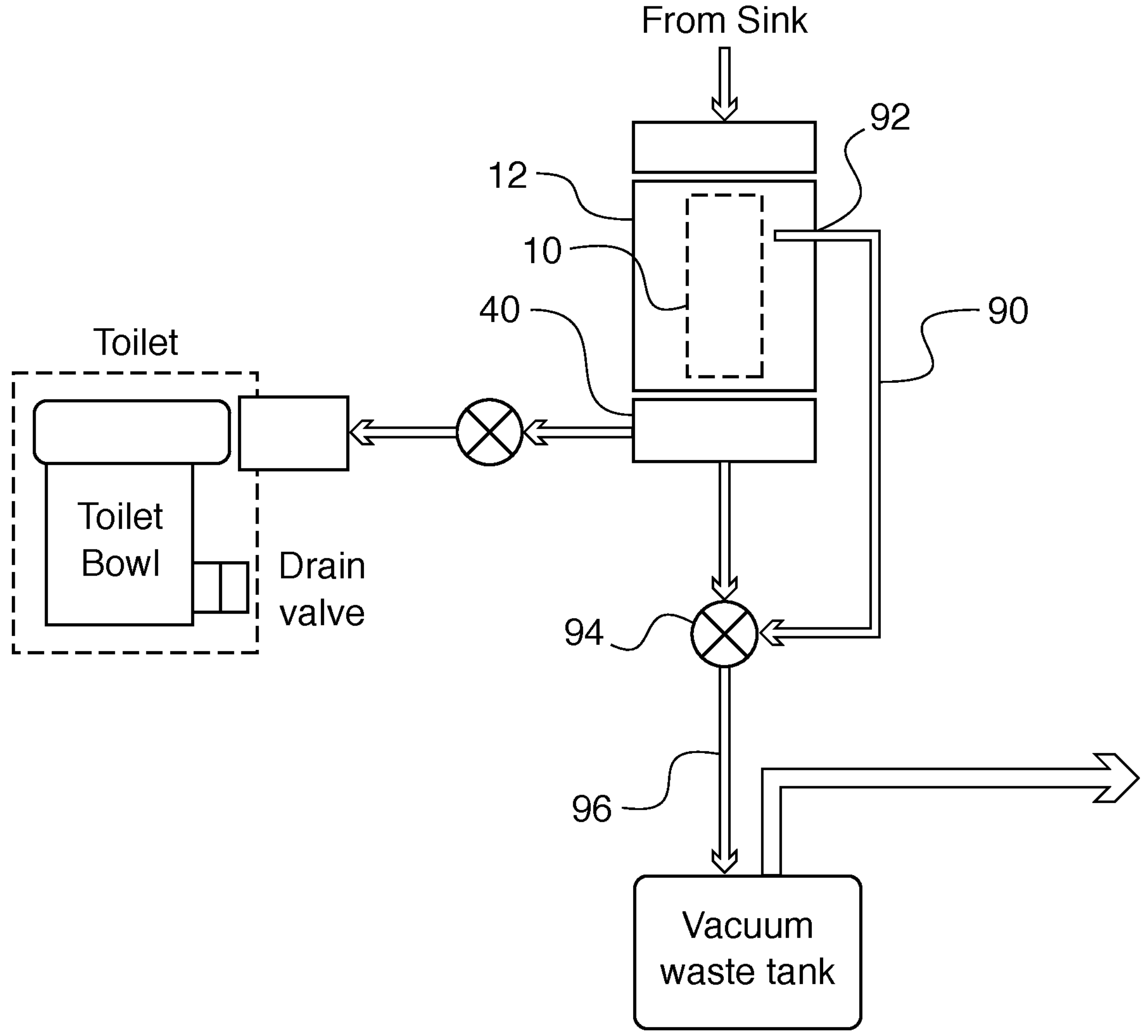
FIG. 10 shows a schematic view of a reservoir with an exhaust extraction line.

Additionally, when an electrochemical filter system is used, there may be undesirable gas exhaust created that must be disposed. For example, hydrogen gas may be created during the filtration process. It is generally preferable that no outgas be released into the aircraft environment. Accordingly, this disclosure provides a method in which to vent exhaust gas. Referring now to FIG. 10, there may be provided an exhaust extraction line 90. This exhaust extraction line 90 may exit the reservoir 12 and deliver any exhaust gas created within the reservoir 12 to the main waste tank, to an aircraft outflow valve, or both. The exhaust extraction line 90 may exit the reservoir 12 at opening 92 and direct gas to valve 94. The exhaust extraction line 90 may then deliver the exhausted gas back into the main waste line 96 that flows to the main waste tank.

Figure 11:
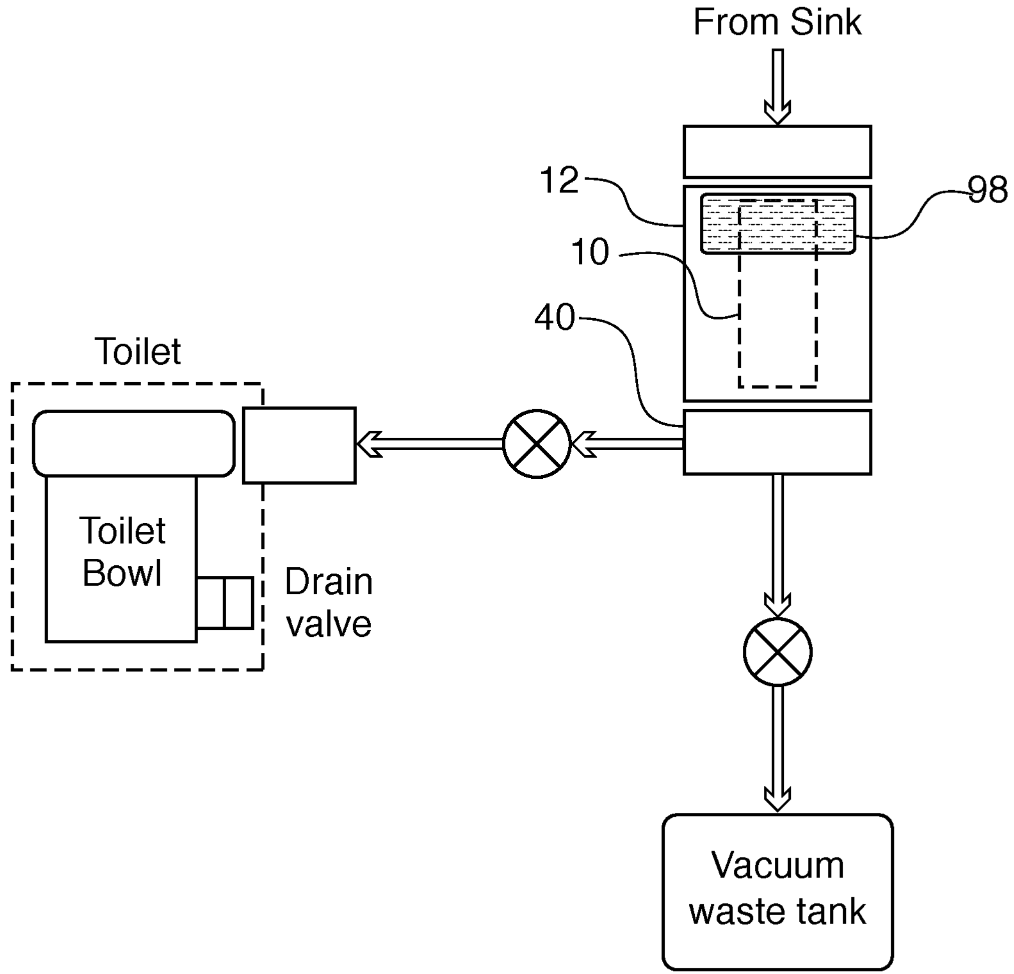
FIG. 11 shows a schematic view of a reservoir with a replaceable gas absorbent material positioned therein.

Additionally or alternatively, there may be provided a gas absorbent material 98 positioned within the reservoir 12. One example is illustrated by FIG. 11. The gas absorbent material 98 may react with exhaust gases in order to capture safely capture the gases. In one example, the gas absorbent material 98 may capture the gases and turn them into a gel within the material 98. The gas absorbent material 98 may be removable and replaceable. It is possible for there to be provided an indicator that indicates when the gas absorbent material 98 is saturated and should be changed.

Figure 12:
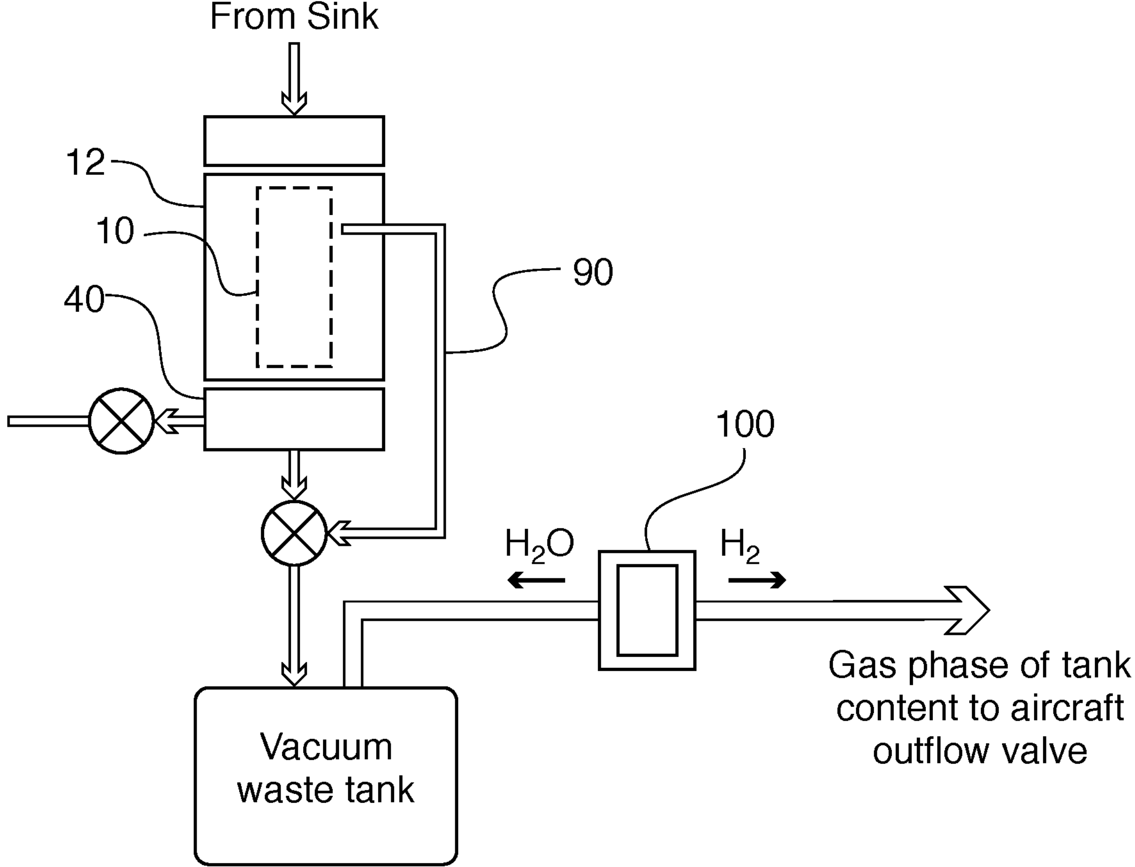
FIG. 12 shows a schematic view of a reservoir that delivers its exhaust gas to a hydrogen fuel cell.

In a further embodiment, it is possible to capture the exhaust gas, hydrogen and reuse the gas. Specifically, if the exhaust gas is hydrogen, it may be directed for use in a hydrogen fuel cell 100. As illustrated by FIG. 12, it is possible for there to be a hydrogen fuel cell 100 on board the vehicle, which fuel cell uses hydrogen gas as one of its input. It is possible for the exhaust extraction line 90 to extract hydrogen gas as exhaust gas, and route the hydrogen gas via an appropriate conduit to a remote hydrogen fuel cell 100.

Figure 13:
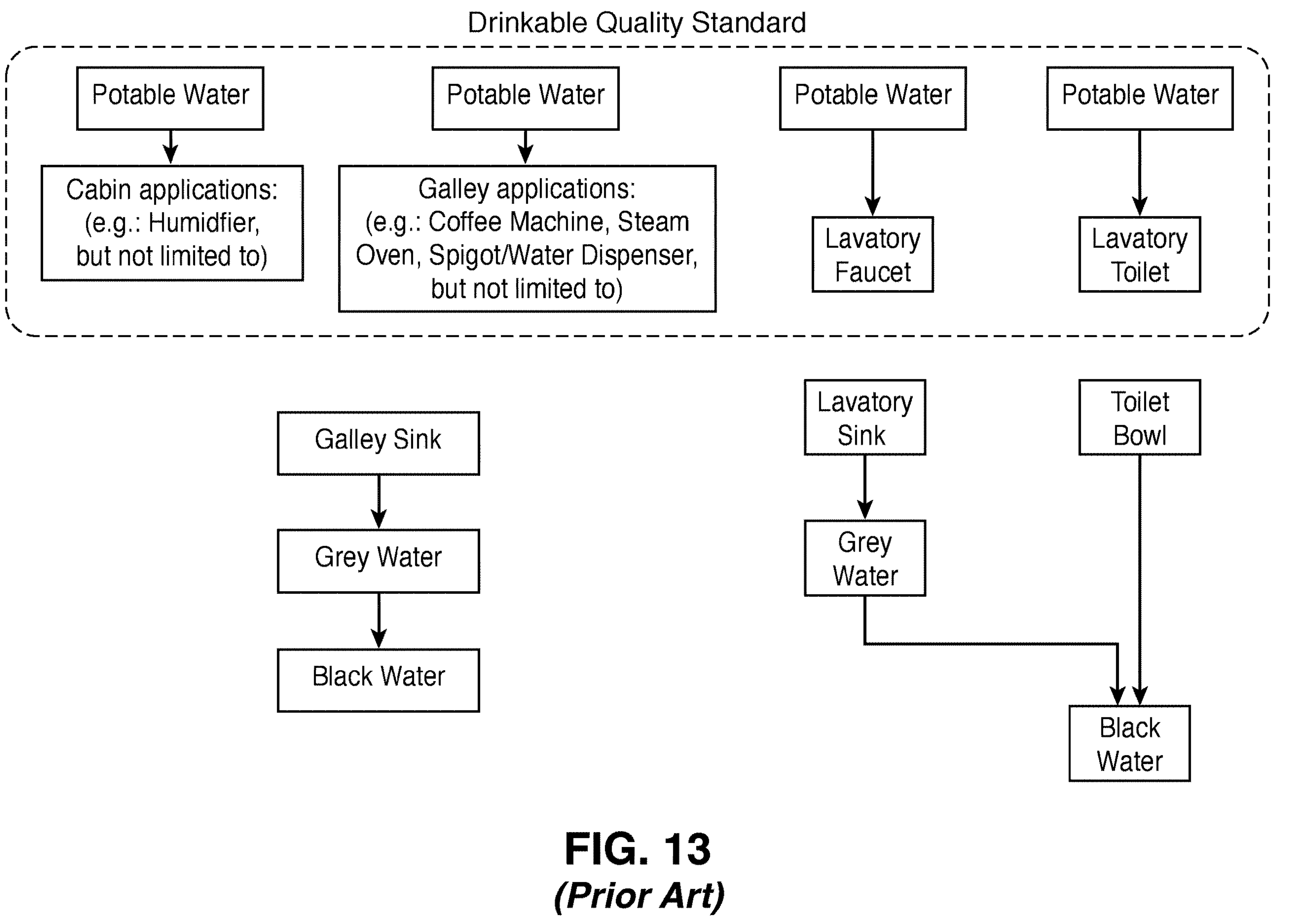
FIG. 13 shows a flowchart of a prior art use of water onboard a passenger transportation vehicle.

FIG. 13 provides a schematic of a current fluid flow process used onboard passenger transportation vehicles. In this flow, potable water is used in all applications, including cabin applications, galley applications, lavatory faucets, and lavatory toilets. Used water from all of these uses flows to the main waste tank. In this process, grey water (most often in the form of used handwashing water) is treated the same as black water (most often in the form sewage water), and all fluids are collected in the main waste tank and disposed.

Figure 14:
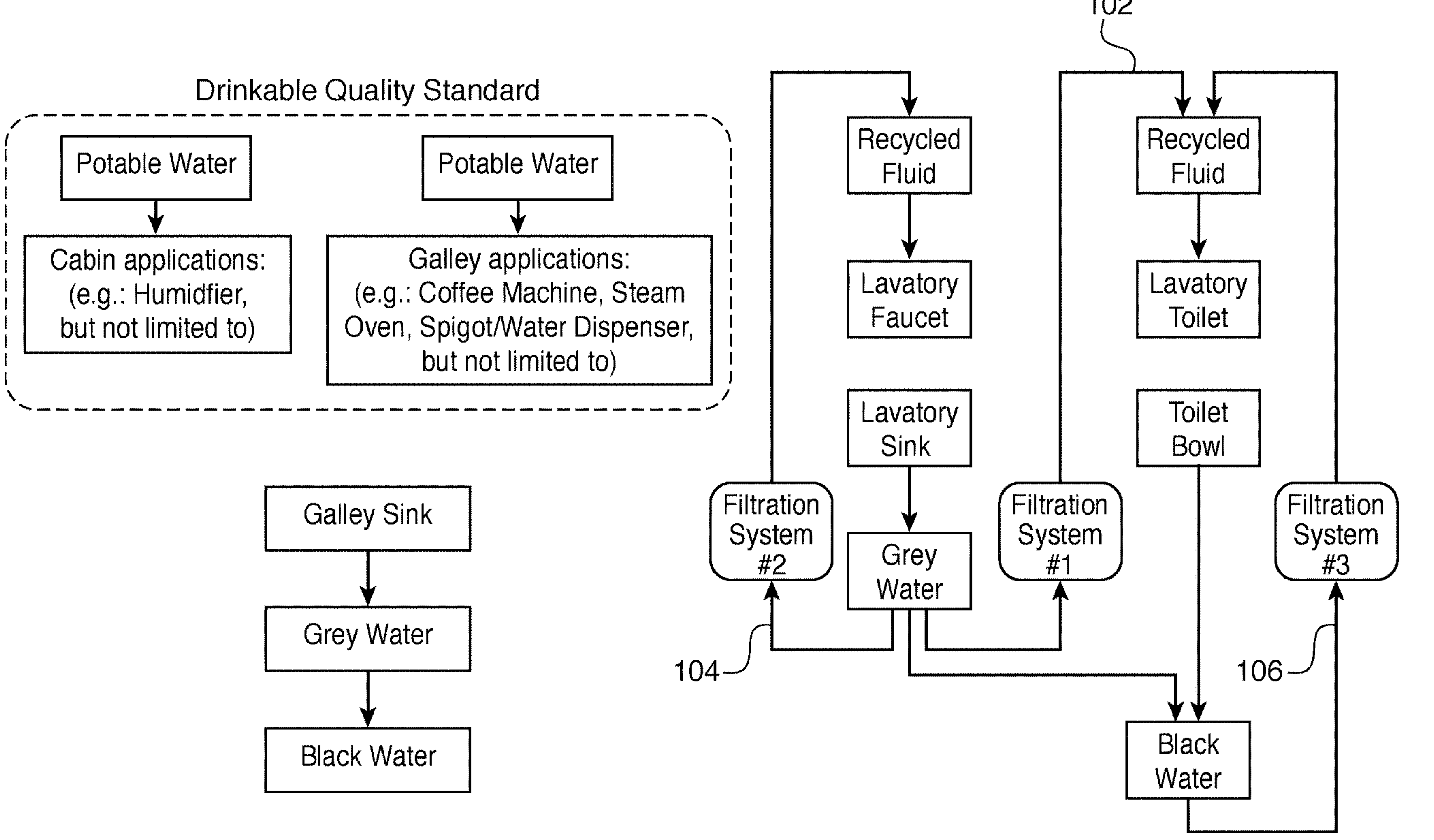
FIG. 14 shows a flowchart of the various filtration systems described herein that may be used to treat water onboard a passenger transportation vehicle.

FIG. 14 illustrates a recycled fluid flow as described herein. In this example, grey water from a lavatory sink may flow to a filtration system and be recycled. As illustrated, in a first example fluid flow 102, grey water from the lavatory sink is collected as described above, delivered through a first filtration system to provide recycle fluid that may be delivered to a lavatory toilet for flushing. In a second example fluid flow 104, grey water from the lavatory sink is collected as described as above, and delivered through a second filtration system. This is second filtration system may have a higher level of filtration, may use multiple filter systems, or may use any other appropriate filtration options that treat the collected grey water to a level that is acceptable for reuse in a lavatory faucet for another round of hand washing.

In a third example fluid flow 106, black water may be collected from a toilet bowl and delivered through a third filtration system. This third filtration system is designed to receive black water from lavatory flushing and is sufficient to treat received water for recycled use in additional lavatory flushing. This third filtration system may use a mechanical filter system, an electrochemical filter system, a chemical treatment system, a UV treatment system, or any other appropriate filter system designed to treat the black water to a sufficient level. The general goal with the third fluid flow 106 is to continue the goal of recycling on board water to prevent the aircraft from having to carry additional water. Rather than using potable (drinkable) water for toilet flushing, and rather than using the filtered grey water for toilet flushing, it is envisioned that the used toilet water itself may be cleaned to a sufficient level for reuse in subsequent toilet flushing.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A system for capturing used water, treating the used water to a determined treatment level to provide treated water, and recycling the treated water on board a passenger transportation vehicle, comprising:

a reservoir in fluid communication with a basin, the reservoir comprising:

an upper opening;

a top lid comprising:

a fluid inlet for receiving used water from the basin and further including a vent; and one or more backwash rings that include a circular opening;

an outlet;

a filter system configured to be removably positionable within the reservoir and supported by the top lid, the filter system configured to treat the used water to a determined treatment level to provide treated water; and an adapter positionable at the outlet of the reservoir, the adapter comprising, within the adapter, a first fluid channel for delivering the treated water to a first location and a second fluid channel for delivering any untreated water or excess treated water to a second location.

2. The system of claim 1, wherein the first location comprises a water-using system or a fluid treatment stack.

3. The system of claim 2, wherein the water-using system comprises a toilet flush system, a sink faucet, or a potable water delivery system.

4. The system of claim 1, wherein the second location comprises a drain line, a vacuum waste tank, a drain mast, a fluid treatment stack, or any combination thereof.

5. The system of claim 1, wherein the determined treatment level comprises a first treatment level sufficient for use of the treated water as toilet flushing water.

6. The system of claim 1, wherein the determined treatment level comprises a second treatment level sufficient for use of the treated water as potable or drinkable water quality.

7. The system of claim 1, wherein the filter system comprises a porous polymeric mechanical micro filter.

8. The system of claim 1, wherein the filter system comprises an electrochemical filter comprising a porous anode filter core and a metal mesh cathode.

9. The system of claim 1, wherein the filter system is positioned within the reservoir via a filter holder.

10. The system of claim 1, wherein the filter system comprises a mixing pump to enhance water contact time.

11. The system of claim 1, wherein the filter system comprises a spiral or stepped configuration to enhance water contact time.

12. The system of claim 1, wherein the circular opening is configured for generating a cleaning vortex within the reservoir.

13. The system of claim 1, further comprising a gas absorbent material positioned within the reservoir to capture and react with exhaust gases released during filtration.

14. The system of claim 1, further comprising an exhaust extraction line for delivering exhaust gases released during filtration out of the reservoir.

15. The system of claim 14, wherein the exhaust extraction line delivers exhaust gases to an aircraft outflow valve.

16. The system of claim 14, wherein the exhaust extraction line delivers exhaust gases to a hydrogen fuel cell.

17. The system of claim 12, wherein the one or more backwash rings include a block element that is configured to block the vent to force air pulled into the vent to flow into the filter system, and one or more protrusions configured to cooperate with a groove of the top lid to secure the one or more backwash ring to the top lid.

18. The system of claim 12, wherein the one or more backwash rings is shaped to fit at a base of the fluid inlet with a circular perimeter with one or more openings.

19. A system for recycling fluid on board a passenger transportation vehicle, comprising:

a grey water reservoir in fluid communication with a lavatory sink, the grey water reservoir comprising:

an upper opening;

a top lid comprising:

a fluid inlet for receiving used water from the lavatory sink in the grey water reservoir;

one or more backwash rings that include a circular opening; and a vent;

an outlet for directing used water from the grey water reservoir;

a first filtration system sufficient to treat the used water for recycled use in lavatory toilet flushing, the first filtration system in fluid communication with the grey water reservoir;

a second filtration system sufficient to treat the used water for recycled use in a lavatory faucet, the second filtration system in fluid communication with the grey water reservoir, wherein the first filtration system and the second filtration system are supported by the top lid; and means for directing used water from the grey water reservoir to the first filtration system and the second filtration system.

20. The system of claim 19, further comprising a third filtration system configured to receive black water from lavatory toilet flushing and sufficient to treat the received black water for recycled use in additional lavatory flushing.

* * * * *